(12) United States Patent  (10) Patent No.: US 8,570,275 B1
Harris  (45) Date of Patent: *Oct. 29, 2013

(54) COMMUNICATION DEVICE WITH ADVANCED CHARACTERISTICS

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,843

(22) Filed: Jul. 17, 2012

Related U.S. Application Data

(63) Continuation of application No. 13/012,306, filed on Jan. 24, 2011, now Pat. No. 8,223,122, which is a continuation of application No. 11/873,817, filed on Oct. 17, 2007, now Pat. No. 7,880,722.

(51) Int. Cl.
  *G06F 3/033*  (2013.01)
(52) U.S. Cl.
  USPC ............................................ 345/158; 345/169
(58) Field of Classification Search
  USPC .................... 345/156–160, 169, 168
  See application file for complete search history.

(56) References Cited

U.S. PATENT DOCUMENTS

| | | | |
|---|---|---|---|
| 5,764,936 A | 6/1998 | Evans et al. | |
| 6,348,878 B1 | 2/2002 | Tsubai | |
| 7,023,426 B1 | 4/2006 | Robinson | |
| 7,479,949 B2 | 1/2009 | Jobs et al. | |
| 7,480,001 B2 | 1/2009 | Endler et al. | |
| 7,677,737 B2 | 3/2010 | Lonn | |
| 2002/0030790 A1 | 3/2002 | Derryberry | |
| 2002/0049751 A1 | 4/2002 | Chen et al. | |
| 2002/0180726 A1 | 12/2002 | Shi et al. | |
| 2005/0001920 A1 | 1/2005 | Endler et al. | |
| 2005/0174334 A1 | 8/2005 | Hannay | |
| 2006/0026535 A1 | 2/2006 | Hotelling et al. | |
| 2006/0067310 A1 | 3/2006 | Murai | |
| 2006/0117086 A1 | 6/2006 | Ho | |
| 2006/0179114 A1 | 8/2006 | Deeds | |
| 2006/0234784 A1 | 10/2006 | Reinhorn | |
| 2006/0279532 A1 | 12/2006 | Olszewski et al. | |
| 2007/0127702 A1 | 6/2007 | Shaffer et al. | |
| 2007/0281747 A1 | 12/2007 | Pletikosa et al. | |
| 2008/0112553 A1 | 5/2008 | Chen et al. | |
| 2008/0152097 A1 | 6/2008 | Kent | |
| 2008/0278894 A1 | 11/2008 | Chen et al. | |
| 2009/0115915 A1 | 5/2009 | Steinberg et al. | |
| 2009/0181645 A1 | 7/2009 | Chan et al. | |
| 2010/0167787 A1 | 7/2010 | Weisbrod | |
| 2010/0250497 A1 | 9/2010 | Redlich et al. | |
| 2011/0264733 A1 | 10/2011 | Klassen et al. | |

*Primary Examiner* — Ricardo L Osorio

(57) ABSTRACT

A communicator device which allows improved functions. The communicator device may have real movable keys which are reconfigured when the device is used in different orientations. In a sideways orientation, the device has a rectangular aspect ratio which is wider than it is tall. And in that sideways orientation, the buttons are reconfigured to the orientation they would normally have. The communicator device may also be reoriented into the other position, in which case the assignment and the indication on the buttons is also correspondingly changed. The communicator device may have a projector to project videos, and the communicator device may be able to retrieve numbers and e-mails to be used for communications from a repository on the Internet or from a search engine on the Internet.

17 Claims, 2 Drawing Sheets

COMMUNICATION DEVICE WITH ADVANCED CHARACTERISTICS

CROSS-REFERENCE

The application is a continuation of U.S. application Ser. No. 13/012,306 filed Jan. 24, 2011, now U.S. Pat. No. 8,223,122 issued Jul. 17, 2012, which is a continuation of U.S. patent application Ser. No. 11/873,817 filed on Oct. 17, 2007, now U.S. Pat. No. 7,880,722 issued Feb. 1, 2011, the contents of each of which are incorporated by reference herein in their entireties.

BACKGROUND

New communication channels will enable the use of new communication devices having special functions. Some of these functions may be similar to things previously found in mobile phones. There may also be additional functionality.

In addition to this additional functionality, these devices will typically operate from transmissions and receptions over new frequency bands. For example, the band previously associated with analog television, the 700 MHz range, will eventually be provisioned for other uses. One such use may be a hybrid communication device which enables communication as a cellular telephone, but also enables other kinds of communication functions, such as communication of video e.g. wireless television or other communication, communication of video telephony, and other uses.

SUMMARY

The present application teaches a new communicating device with special functions.

One aspect defines a communicating device with a number of individual buttons, each button independently actuatable, and each button being reconfigurable to a different function. The button displays information indicative of its current function.

Another aspect describes multiple qualities of communication on such a device.

Another aspect describes a projector associated with a communication device;

Another aspect describes a web-based "dialer" for a portable communication device.

DETAILED DESCRIPTION

Figure 1:
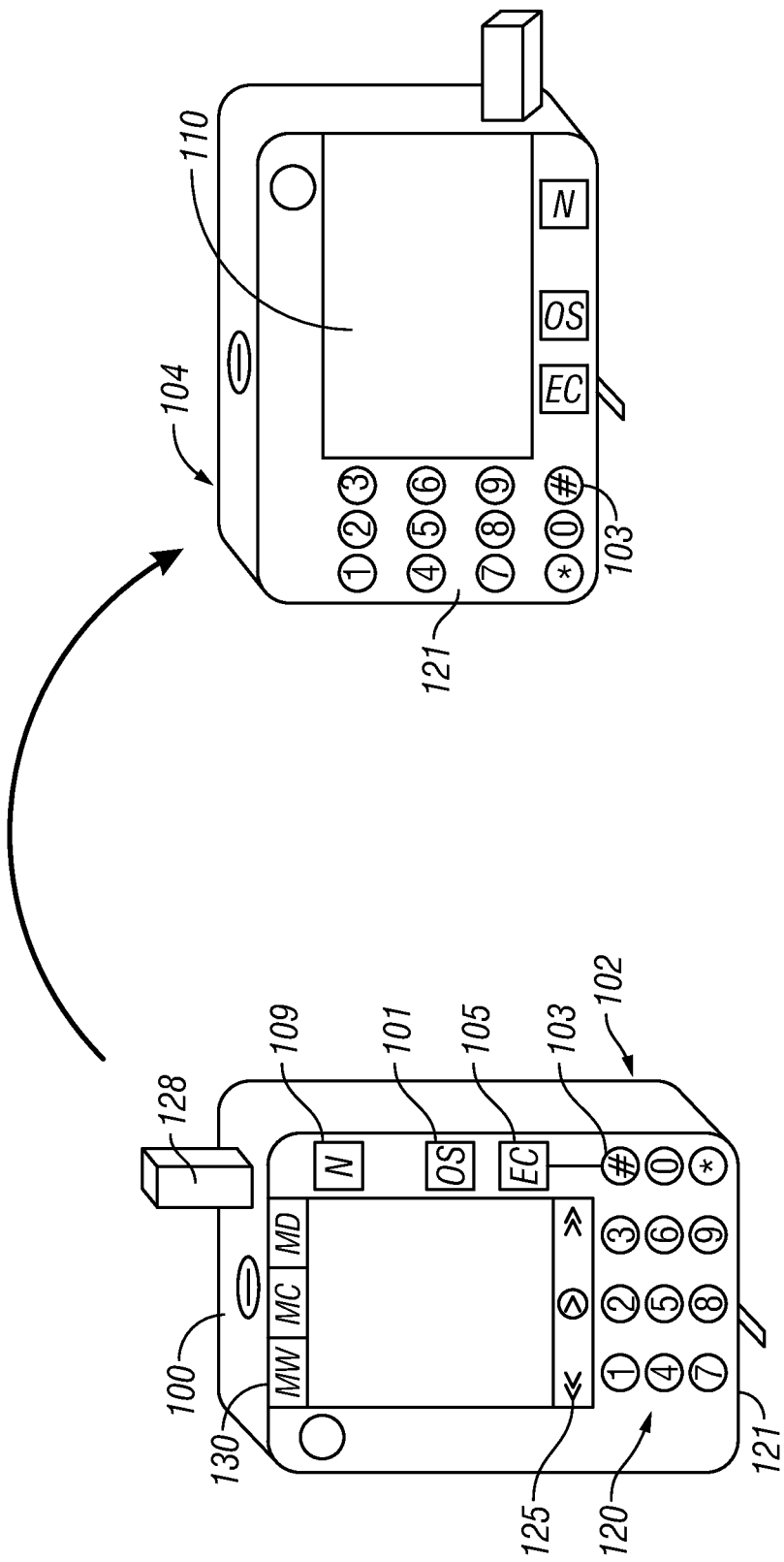
FIG. 1 shows an embodiment using a phone that is reconfigurable between different orientations.

FIG. 1 shows a first embodiment with ability to provide widescreen display of information.

Conventional cellular phones included a display which had an aspect ratio close to 1:1. While this kind of display was adequate for displaying things like telephone numbers and certain kinds of pictures, more modern display devices display a wider aspect ratio is associated with high definition television. For example, a 16×9 display device is now conventional for HDTV—this display device is wider than it is tall.

Widescreen display, however, is inconsistent with the way that a normal telephone is often laid out. A portable telephone is often rectangular with a relatively thin width, enabling the phone to be placed in a pocket or slot, to facilitate its storage. The normal layout of a mobile phone is inconsistent with the "wide" screen.

In the embodiment, the mobile phone can be rotated between a first orientation where the phone has a thin width, and a second orientation where the phone has a wide aspect ratio.

A first embodiment describes a communicator 100, e.g. a mobile phone that has two different usable orientations, a first orientation shown as 102, and an orthogonal orientation shown as 104. In the orthogonal orientation, a display screen 110 shows a wide aspect ratio where the width is at least 1½ times the height of the screen, for example 16×9 or even wider. The phone also includes a number of selection keys, shown as number keys 120 for entering telephone numbers. In the embodiment, each key 120 is a separate key which can be depressed to actuate the number that is shown on the face of the key, as in a standard mobile phone. Each of these keys is a button that is spring-loaded and can be depressed to actuate. The depressing typically also includes a tactile "click" when depressed, facilitating the user's entry of data using these keys. Each key has a number associated with one button, as on a standard phone. That is, in this embodiment, the keys are not soft keys defined on the screen, but are rather real and discrete keys that can be depressed against the spring force, and once depressed produce a clicking action to indicate to the user that the button has actually been depressed.

Keys 120 shown in FIG. 1 can be numbered keys, e.g. 1-9, 0, * and #. Alternatively, these keys can be the keyboard style "QWERT." keys.

The device 100 also includes an orientation Sensor 101 which senses a position in which the phone is being held—between the orientations 102, 104. The orientation sensor 101 can be any of a number of different kinds of devices which determine whether the phone is in the orientation 102 or in the orientation 104. When in the orientation 102, the keys 120 are each defined as shown in 121, that is the key closest to the display are 1, 2 and 3.

When the phone is rotated, however, the values on the keys 120 change, and these keys acquire different values 121 so that the keys closest to the display 110 become 3, 6 and 9. In other words, the keys change value depending on the specific position of the cellular phone.

It has been suggested that cellular telephones can have soft keys which change value when the phone is rotated. However, this phone uses discrete, spring loaded keys, that display a value associated with the key's current value, and that change that value, and display a different value, when the phone is reoriented.

Different ways can be used to display numbers on the keys.

In a first mode, for example, each of the keys may have a digital display device such as a liquid crystal device associated with the top surface of the key. An electronic controller 102 is connected to each of the keys and also is responsive to the orientation determined by the orientation sensor 101. The controller automatically controls the value that is displayed on the keys. For example, in orientation 102, the key 103 has the value #, which is displayed on the surface of the key. When the device is rotated to orientation 104, key 103 may be reassigned to the value "*", and hence displays the "*" as shown, and when depressed, produces the *.

An alternative embodiment may use any other kind of spatial light modulator to produce an image indicative of a number or other indicia on the surface of the button. For example, one embodiment may use a digital mirror to shape a light beam in a way that is projected on the inside surface of the button. In this way, the buttons, which are real analog buttons, are electronically altered to refer to different values and to display these different values. This electronic alteration enables real analog buttons to be used in a rotatable phone, that is rotatable between a "talking position" 102, and a wide aspect ratio position 104.

In the position shown as 102, the screen may be a narrower aspect ratio. However, in this position, additional functions may be displayed on the extra area of the screen. placed on the screen. For example, the functions 125 indicate a digital video recorder functions for recorded video. In this way, video can be received over the link, and played, fast forwarded, or reversed using these functions. Other functions may also be used, for example, Internet functions to obtain data to be displayed from stored Internet preferences. 130 represents these Internet functions, where the phone 100 can receive information from these functions.

Another aspect relates to the way that data is received in this kind of communicator. Conventional 700 MHz television was received using rabbit ears and the like. It is contemplated that communications received over this band will be digital in the future. However, the quality of this digital reception will be dependent on many things, including the size of the antenna and the positioning of the communicator device. If the device included a large and unwieldy antenna, it is believed that there would be significant consumer resistance to such a device. Accordingly, a small antenna such as shown in FIG. 1 as 128, is contemplated. However this kind of the antenna will not always receive perfect reception.

In an embodiment, the antenna 128 sends its data to an "N channel detector" device 129. 129 determines how many of the N channels can be received depending on the quality of the reception that is received at any particular moment. The reception may include in-phase (I) and quadrature (Q) channels of information. There may be many such channels, including an I/Q channel 1, and an I'/Q' channel 2, and perhaps others. The detected quality of the connection allows the system to determine how much information it receives. In one embodiment, there may be four channels of quality:

A first quality where only a single channel is received, e.g., which receives only AM quality sound, and minimal quality Internet. The minimal quality Internet may be text only, and may hold-holding back the high quality images, or displaying those high quality images only later.

A second quality where N=2 may be obtained when two different channels can be received. For example, second quality may get a somewhat better sound, e.g., FM sound, and better Internet quality, e.g., with images and/or higher quality images.

For example for all qualities of N=2 or less, the video for streaming may be received only in an offline/video recorder mode. The streaming video can only be displayed based on a buffer.

Channel N=3 may also be provided, e.g., when three channels are received, one may receive streaming video, and get higher quality on the other parts. Finally, n=4 may provide full video and television capability.

This produces the unexpected advantage of allowing this communicator system to operate even when the reception is not as good as planned. For example, if bad reception was obtained without correspondingly reducing the amount of data that was displayed, then a very disappointing display would be produced. For example, the display might be formatted as though it was going to receive a large quantity of information, but less than all the information would be received by virtue of the bad reception. The present system produces the unexpected advantage of lowering the amount of information that will be displayed based on the amount of information that is received via the reception. When less data is received, the system displays less data.

While the above describes four channels, it should be understood that there can be any number of channels provided in this way. The digital video recorder mode may use the controls 125.

Figure 2:
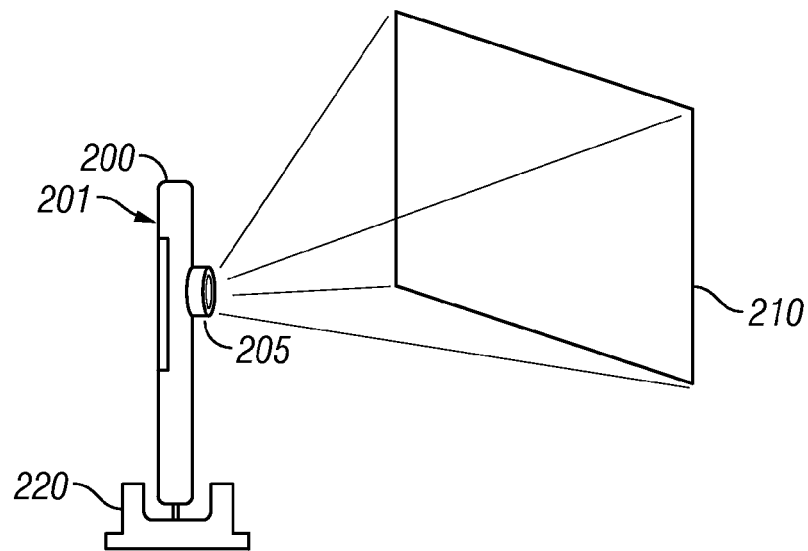
FIG. 2 shows an embodiment with a projector within a portable communicator.

FIG. 2 illustrates an alternative embodiment, in which the communicator device 200 includes a projector function 205 therein, where the projector function displays the video images on a screen such as 210. The communicator device allows communications, e.g., cell phone calls, and also allows receiving still and video transmissions over the wireless connection, e.g., a network. In the embodiment, the device may also include a camera 201. The camera 201 senses the brightness of the ambient area, and defines the brightness of projection based on the brightness sensed by 201.

The projector 205 may be an LED projector, or may be a projector of the type described in my co-pending application Ser. No. 11/683,978, the disclosure of which is herewith incorporated by reference. The projector may use a micromechanical mirror and/or mirror array to project the light. The projector as used herein may be an LED-based projector.

The LED projector, however, may be relatively weak in its projection capabilities. According to one embodiment, the portable device 200 may be docked with a docking connector 210 that provides external power in order that allows producing a higher brightness output. The docking connector may be driven from AC power, or alternatively can be a battery pack.

Figure 3:
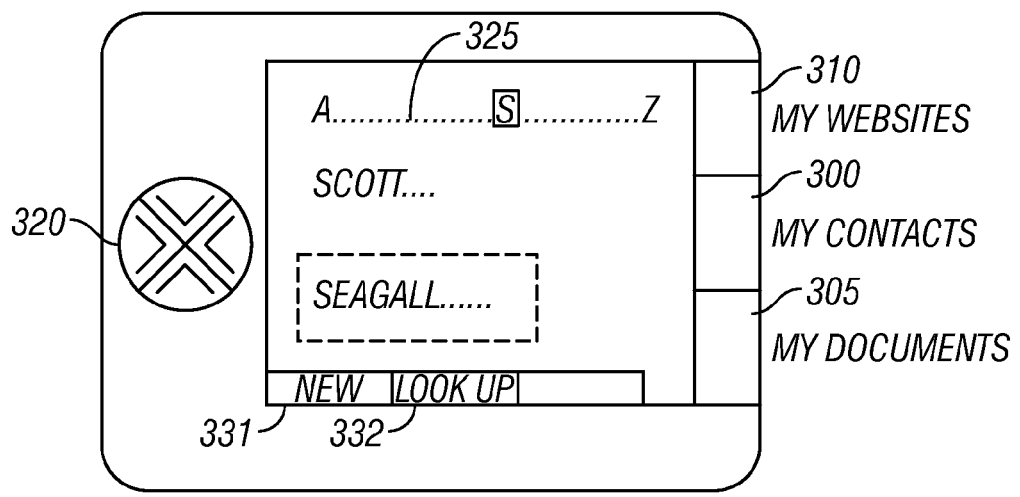
FIG. 3 shows a communicator that uses an internet based contacts storage.

FIG. 3 illustrates another embodiment, in which the storage for the portable communication device is web driven. Classic communication devices have allowed selecting a telephone number or storing locally stored contacts, or to enter a telephone number. The device in FIG. 3 uses a wholly different paradigm. According to this device, the stored information for using the communicator device is stored on a remote (e.g., internet-based) storage unit, which stores information shown in as "my contacts" 300, "my documents" 305, and "my websites" 310. An advantage of this system is that a user can store whatever personal information they might want or need on their internet repository. Any of multiple different phones or communication devices can then bring up this personal information, including contacts, and other information.

A selector 320 is used to select one of the items, such as "my contacts". By bringing up the "my contacts", a number of soft keys 325 may be displayed at a portion of the screen, e.g. representing letter ranges (1-r; s-v, etc), or categories (family, friends, coworkers), or voice activation. A selection of one of the soft keys may bring up a list of the different contacts associated with that soft key. One can choose any of those contacts such as 330, for calling. Alternatively, one can select the voice activation which allows speaking into the communicator, and sending information indicative of the spoken voice to select a contact (or other item) from the web-based storage.

All these contacts are stored on an Internet-based storage, rather than being stored locally in the phone. Different options are also provided for communicating over this kind of communicator where the storage of information is internet-based. One option is entering a new contact. Another option allows looking up a contact using a search engine 332. For example, this latter option may allow entering (or saying) whatever information is known about the desired contact. This might be, for example, "John Stout, Del Mar California"

for a person, or "Rice King in Ontario Canada". This entered phrase is sent to an internet based search engine, which returns hits based on this search phrase. The hits may be truncated to show only part of the result, and may extract the telephone number from the part, and show that separately. As an alternative, the telephone number may be hidden, but selecting the 'hit' causes that telephone number to be dialed.

The system may automatically recognize phone numbers and e-mail addresses within the results from the Internet search. Those results may be automatically placed into a buffer and used to initiate communication if the results are selected. When multiple different phone number/e-mail addresses are found, the user may be prompted for which mode of communication to use for the communication.

Each time that one of these options are selected, a soft keyboard may be displayed on the mobile phone. The soft keyboard may be selectable via touchscreen, or can be selected using the selector 320.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other case sizes and shapes are intended to be encompassed. Other kinds of communicators beyond cell phones and blackberry type devices are contemplated.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The communicator described herein may include any kind of computer, either general purpose, or some specific purpose computer such as a workstation. The computer may be an Intel (e.g., Pentium or Core 2 duo) or AMD based computer, running Windows XP or Linux, or may be a Macintosh computer.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A portable communicator device, comprising:
   a user interface, which has a data entry part that accepts entry from a user, including entries about a requested information item, a display screen that displays information about the requested information item, wherein said requested information item includes at least one desired contact that is not stored in a local memory on the portable communicator device, a communication part that communicates wirelessly;
   a computer programmed to operate including input from said user interface, and also operating based on receiving a requested information item entered on said user interface, and also receiving first information about which of a plurality of different internet accessible storage units to search for said requested information item, to send a request addressed to an Internet accessible storage unit based on said first information, and to receive second information from said Internet accessible storage unit responsive to said request, the second information including at least personal communication information for said at least one desired contact,
   said computer operating to receive said at least said personal communication information and using said personal communication information for initiating a communication to said desired contact using said communication part.

2. The device as in claim 1, wherein said Internet accessible storage unit is a remote storage that stores stored list of contacts that is uniquely associated with the user.

3. The device as in claim 1, wherein said Internet accessible storage unit is a search engine on the Internet that is remotely and publicly available.

4. The device as in claim 1, wherein said computer also sending the request as an Internet search to an Internet-based search engine that returns search results based on said request; wherein said computer operates to receive Internet pages from the Internet search, further comprising a memory, having a memory area forming a buffer, and said search results being stored in said buffer, and wherein said computer operates to automatically recognize communication information within said search results of said Internet search, and to use said communication information as said personal communication information to initiate
   said communication using said communication part.

5. The device as in claim 1, wherein said computer also sending the request as an Internet search to an Internet-based search engine that returns search results based on said search; wherein said computer operates to receive Internet pages from the Internet search, Where said computer displays only part of said pages on said display, where said part includes at least the communication information.

6. The device as in claim 5, wherein said only part includes both phone numbers and e-mails addresses received from the Internet.

7. The device as in claim 5, wherein said computer displays a specific soft keyboard in response to which of the Internet accessible storage units are selected.

8. The device as in claim 1, wherein said computer also stores information about specific websites associated with the user in said Internet accessible storage unit.

9. The device as in claim 1, wherein said computer also stores information about specific documents associated with the user in said Internet accessible storage unit.

10. A portable communicator device, comprising:
    a user interface, which has a data entry part that accepts entry from a user, including entries about a requested information item, a display screen that displays information about the requested information item, wherein said display screen shows specific websites associated with the user based on remotely stored information;
    a communication part that communicates wirelessly, responsive to controls entered on the user interface; and a computer programmed to operate responsive to entries on said user interface, and to control said user interface to control said communication part, and said computer also operating to receive information from an Internet accessible storage unit including at least personal communication information for at least multiple different web-sites, and showing said multiple different websites as said specific web-sites on said display screen.

11. The device as in claim 10, wherein another said requested information item includes at least one desired contact whose name is not stored in a local memory on the portable communicator device, and where said computer operating based on receiving a requested information item, and also receiving first information about which of a plurality of different repositories to search for said desired contact, to send a request addressed to an Internet accessible storage unit based on said first information, and to receive second information from said Internet accessible storage unit responsive to said request, the second information including at least personal communication information for said one desired contact, said computer using said personal communication information for initiating a communication to said one desired contact using said communication part.

12. The device as in claim 10, wherein said computer also stores information about specific documents associated with the user in said Internet accessible storage unit.

13. A server that connects to multiple remote communicators, comprising:

a computer, receiving a first request for information about at least one desired contact from a first remote communicator associated with a first user over a wireless link;

said computer searching a first set of contacts stored on said computer associated with said first user, responsive to receiving said first request;

said computer returning information about said one desired contact to said to said first remote communicator over said wireless link, responsive to said first request for information;

said computer also receiving a second request for information about another desired contact from a second remote communicator associated with the first user, where the second remote communicator is different than the first remote communicator, but associated with the same first user;

said computer searching said first set of contacts stored on said computer associated with said first user, responsive to receiving said second request;

said computer returning information about said another desired contact to said second remote communicator over said wireless link, responsive to said second request for information.

14. The server as in claim 13, wherein said computer also stores information about specific websites associated with the first user and returns information about said specific websites based on a request.

15. The server as in claim 13, wherein said computer also stores information about specific documents associated with the first user and returns information about said specific documents based on a request.

16. The device as in claim 11, wherein said display computer displays a specific soft keyboard in response to which of the Internet accessible storage units are selected.

17. The computer as in claim 13, wherein said computer instructs said remote communicators to display a specific soft keyboard.

* * * * *